(12) United States Patent
Gailloux et al.

(10) Patent No.: US 9,877,190 B1
(45) Date of Patent: Jan. 23, 2018

(54) SYSTEM AND METHOD FOR AUTHENTICATION AND SHARING OF SUBSCRIBER DATA

(71) Applicant: Sprint Communications Company L.P., Overland Park, KS (US)

(72) Inventors: Michael A. Gailloux, Overland Park, KS (US); Lauren Ricardo St. Aubyn King, Somerset, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 148 days.

(21) Appl. No.: 14/731,054

(22) Filed: Jun. 4, 2015

(51) Int. Cl.
*H04W 12/06* (2009.01)
*H04W 8/20* (2009.01)
*H04L 29/06* (2006.01)

(52) U.S. Cl.
CPC ........... *H04W 12/06* (2013.01); *H04L 63/083* (2013.01); *H04W 8/20* (2013.01)

(58) Field of Classification Search
CPC ....... H04W 12/06; H04W 8/20; H04W 8/205; H04W 8/18; H04L 63/083; G06F 21/31
See application file for complete search history.

(56) References Cited

U.S. PATENT DOCUMENTS

| | | | |
|---|---|---|---|
| 7,606,560 B2 | 10/2009 | Labrou et al. | |
| 2005/0021782 A1* | 1/2005 | Malik | H04L 63/083 709/229 |
| 2011/0295750 A1 | 12/2011 | Rammal | |
| 2013/0273891 A1* | 10/2013 | Sivalingham | H04W 12/06 455/411 |
| 2014/0189347 A1* | 7/2014 | Madani | G06F 21/31 713/164 |
| 2014/0273965 A1* | 9/2014 | Raleigh | H04W 12/04 455/411 |
| 2014/0357229 A1* | 12/2014 | Lee | H04W 12/04 455/411 |
| 2015/0026351 A1* | 1/2015 | Calman | H04L 65/1083 709/227 |
| 2015/0312236 A1* | 10/2015 | Ducker | H04L 63/08 726/4 |

* cited by examiner

*Primary Examiner* — George Eng
*Assistant Examiner* — Hung Du

(57) ABSTRACT

A wireless communication service subscriber authentication platform includes a processor, memory, and an application stored in the memory that, when executed by the processor: receives a request to authenticate a user from an enterprise (the request identifies a phone number of a user equipment device (UE) and an identity of a mobile communication service subscriber associated with the UE); determines a wireless communication service provider that provides wireless communication service to the UE based on the phone number of the UE; sends a request for information about the mobile communication service subscriber to the wireless communication service provider (the information request comprises the phone number of the UE and the identity of the subscriber); receives information from the wireless communication service provider determined to provide service to the UE; and sends an authentication response to the enterprise. The enterprise completes a transaction with the subscriber based on the authentication response.

12 Claims, 8 Drawing Sheets

SYSTEM AND METHOD FOR AUTHENTICATION AND SHARING OF SUBSCRIBER DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Authentication of the identity of a party attempting to execute a commercial transaction, access proprietary data or software, or make other use of online services may be used to prevent an unauthorized or malicious use of the party's identity and the requested services. A lack of adequate authentication can result in the loss of secure information, theft of products or services, etc. Authentication of a party's identity may be desirable when electronically transferring personal information.

SUMMARY

In an embodiment, a wireless communication service subscriber authentication platform includes a processor, a memory, and an application stored in the memory that, when executed by the processor: 1) receives a request to authenticate a user from an enterprise, wherein the request comprises subscriber information received by the enterprise from a mobile communication service subscriber, the subscriber information comprising a phone number of a user equipment device (UE) associated with the mobile communication service subscriber and an identity of a mobile communication service subscriber; 2) responsive to receiving the authentication request, determines a wireless communication service provider that provides wireless communication service to the UE based on the phone number of the UE; 3) sends a request for information about the mobile communication service subscriber to the wireless communication service provider determined to provide service to the UE, where the information request comprises the phone number of the UE and the identity of the subscriber; 4) receives information from the wireless communication service provider determined to provide service to the UE; and 5) sends an authentication response to the enterprise. The enterprise completes a transaction with the subscriber based on the authentication response received from the authentication platform.

In an embodiment, a method of authenticating a wireless communication service subscriber includes: 1) receiving by a subscriber authentication server a first request to transfer a first confidential subscriber information package associated with a first subscriber from a first wireless communication service provider to a second wireless communication service provider, where the first subscriber previously received wireless communication service from the first provider and has transferred service to receive wireless communication service from the second provider and where the second provider sends the first request to the subscriber authentication server, wherein the first confidential subscriber information package comprises a personal identification number (PIN) of the first subscriber and at least one answer of the first subscriber to a security question; 2) responsive to the first request, sending by the subscriber authentication server a first confidential subscriber information package transfer request to the first provider, wherein the first transfer request identifies the second provider; 3) verifying, via one of the first wireless communication service provider and second wireless communication service provider, authorization by the first subscriber to transfer the first confidential subscriber information package; 4) receiving by the subscriber authentication server a second request to transfer a second confidential subscriber information package associated with a second subscriber from the second wireless communication service provider to the first wireless communication service provider, where the second subscriber previously received wireless communication service from the second provider and has transferred service to receive wireless communication service from the first provider and where the first provider sends the second request to the subscriber authentication server, wherein the second confidential subscriber information package comprises a personal identification number (PIN) of the second subscriber and at least one answer of the second subscriber to a security question; 5) responsive to the second request, sending by the subscriber authentication server a second confidential subscriber information package transfer request to the second provider, wherein the second transfer request identifies the first provider; and 6) verifying, via one of the first wireless communication service provider and second wireless communication service provider, authorization by the second subscriber to transfer the first confidential subscriber information package.

In an embodiment, a method of authenticating a wireless communication service subscriber includes: 1) receiving a request to terminate a wireless communication service subscription by a server computer; 2) responsive to receiving the termination request, storing a confidential subscriber information package associated with the terminated service subscription, wherein the confidential subscriber information package comprises a personal identification number (PIN) and a plurality of answers to security questions; 3) receiving by the server computer a request from a different wireless communication service provider to transfer the confidential subscriber information package associated with the terminated service subscription to the different wireless service provider; 4) validating the request to transfer the confidential subscriber information package; and 5) transmitting the confidential subscriber information package associated with the terminated service subscription to the different wireless service provider by the server computer.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
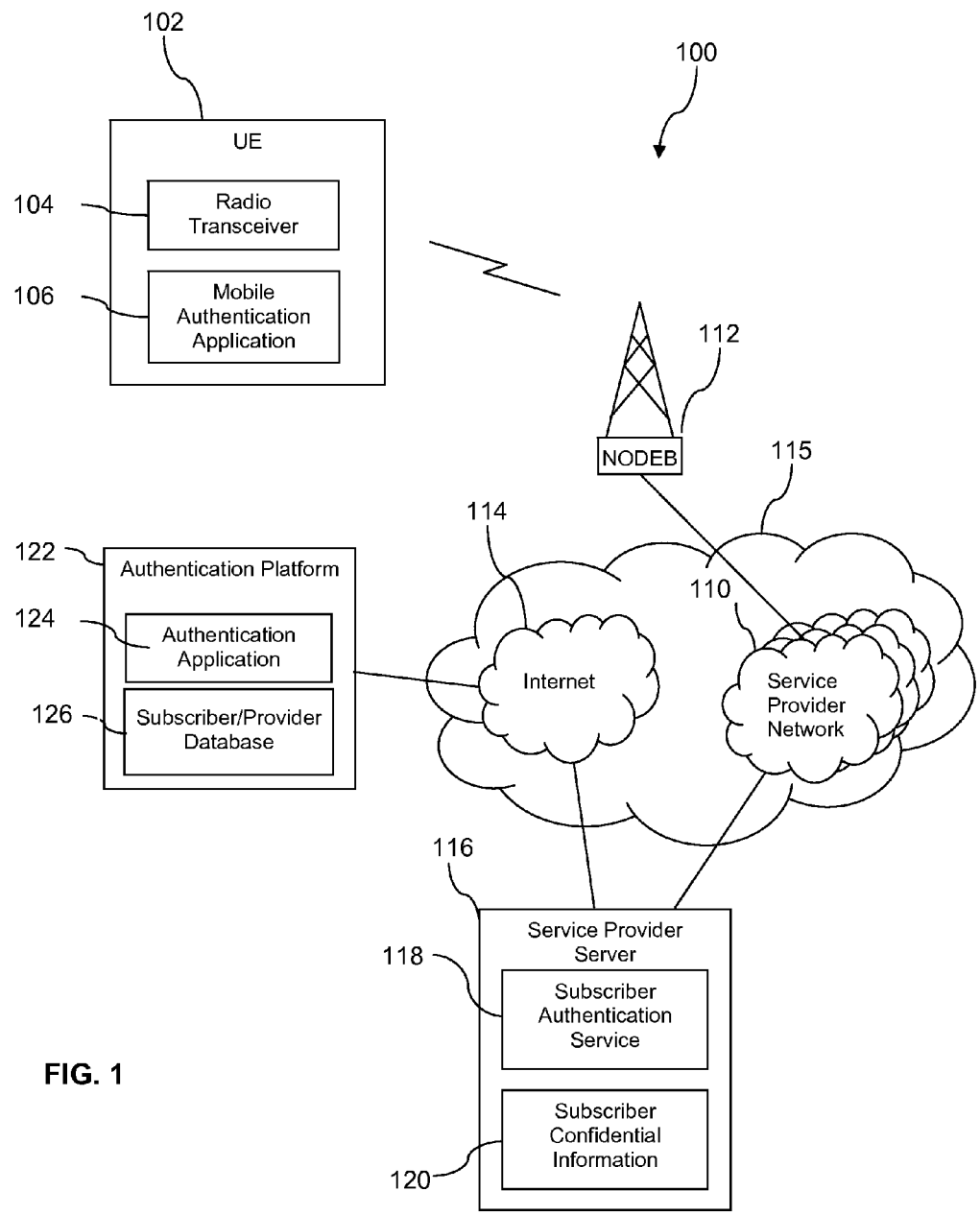
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for using a mobile telephone to authenticate a transaction that is initiated or performed via a network, such as the Internet. Authentication refers to a process by which the identity of an individual is verified. Thus, in the context of Internet transactions, authentication is the process by which the identity of a party requesting performance of a transaction or operation via the Internet is verified.

Embodiments of the present disclosure facilitate secure Internet transactions by providing authentication of the identity of a party requesting the transactions. In various embodiments, a party initiating or performing a transaction provides identifying information, including the party's name and mobile telephone number to a commercial, government, or other, entity involved in the transaction. The entity requests verification of the party via an authentication platform that cooperates with the mobile telephone service providers. The authentication platform identifies which of the various mobile telephone service providers supply telephone service to the telephone number of the party requesting the transaction received from the entity, and forwards the received name and telephone number to the identified mobile telephone service provider along with a request for authentication and identification information for the entity requesting authentication.

The mobile service provider verifies that the telephone number forwarded by the authentication platform is associated with a service subscriber having the name forwarded by the authentication platform, and determines the type of user equipment (UE) employed by the subscriber. The service provider determines how to seek authentication from the subscriber based on the type of UE employed by the subscriber. For example, on a smartphone UE, the service provider may present an authentication dialog showing the name of the entity requesting authentication and other information associated with the transaction or operation for which authentication is sought. The subscriber may respond to the dialog by entering verification that the subscriber authorizes the transaction. The verification may include entry of personal identification information, such as a personal identification number (PIN), entry of biometric data, such as a fingerprint, etc. For some UE devices, the service provider may provide information regarding the transaction, and request authentication via text message or voice exchange. For example, the service provider may send a text message, to the UE, that includes the transaction information and requests receipt of the return text message including the subscribers PIN to authenticate the transaction.

On receipt of the authentication data (e.g., PIN, biometric data, etc.) from the UE, the service provider verifies the authentication, and provides a response indicating authentication success or failure to the authentication platform. In turn, the authentication platform provides a response to the entity requesting authentication. The response to the entity requesting authentication may indicate that the party's identity has been authenticated, or that authentication of the party's identity was unsuccessful.

By providing authentication via a central authentication platform, embodiments of the present disclosure simplify the process of authentication and improve security relative to conventional authentication methods. A mobile telephone subscriber may provide a single PIN, or other personal identification information, known only to the subscriber and the subscriber's mobile telephone service provider, that can be used to authenticate operations performed by any number of different entities via a single verification process that provides a unified user experience across all the different entities. The subscriber's mobile telephone service provider maintains control of the subscriber's personal information and of the verification process with respect to the subscriber.

The authentication platform and method described above may be applied to ensure that transfer of personal information is authorized. For example, over time a wireless service provider may accumulate a body of personal information with respect to a subscriber. The personal information may include a PIN as referenced above, biometric data, security questions and answers, identity information, and other personal information. Transfer of services from one service provider to another may be facilitated by transferring the personal information accumulated by a current service provider to a new service provider. The subscriber's instructions to transfer personal information and/or of wireless service from one service provider to another may be validated via the authentication technologies disclosed herein.

Transfer of such information between successive mobile telephone service providers simplifies the process of authentication by allowing entry of a single PIN, or other personal identification information value, that can be applied to authenticate operations performed by a wide variety of entities. Additionally, the information transfer process obviates the need for the subscriber to reproduce the information that had been accumulated by the previous service provider such as mother's maiden name, favorite pet's name, and the like or to learn a new personal identification number.

FIG. 1 is a block diagram of a system 100 according to an embodiment of the disclosure. The system 100 includes a UE 102, a base station (Node-B) 112, a service provider server 116, and an authentication platform 122. The subscriber authorization platform 122 may also be referred to as a subscriber authorization server. The UE 102 may be cellular telephone, a smart phone, a tablet computer, or other mobile device configured to wirelessly communicate with the Node-B 112. The UE 102 includes a radio transceiver 104 that transmits radio signals to the Node-B 112, and receives radio signals from the Node-B 112. Some embodiments of the UE 102 also include a mobile authentication application 106. The mobile authentication application 106 can present to a subscriber operating the UE 102 details of an authentication request received via the Node-B 112, and provide for entry of authentication information by the subscriber. The authentication entered via the mobile authentication application 106 may take the form of a PIN entry, biometric information (e.g., fingerprint) entry, etc. The mobile authentication application 106 may transmit the entered authentication information via the radio transceiver 104. The UE 102 also includes various other components that have been omitted from FIG. 1 in the interest of clarity. For example, the UE 102 may include one or more antennas, audio circuitry, display circuitry, a processor, memory, etc.

The Node-B 112 is a base station that serves as an access point for communication via network 110 by UE 102. The Node-B 112 may be an evolved node B (eNB) in accordance with the evolved UMTS protocols of the long term evolution wireless communication standard. The Node-B 112 communicates with the UE 102 via radio signals and communicates with the service provider server 116 and other elements of the system 100 via the service provider network 110. The service provider network 110 may include a plurality of switches, routers, software, and other elements to provide connectivity between the Node-B 112 and one or more service provider servers 116. The system 100 may comprise a plurality of service provider networks 110.

The service provider server 116 includes one or more computers and associated computing devices that provide services to the UE 102 and the Node-B 112. The service provider server 116 stores subscriber confidential information 120 and provides a subscriber authentication service 118. In some embodiments, the subscriber confidential information 120 may be stored in a data store accessible by the service provider server 116. The subscriber authentication service 118 communicates with the UE 102 to obtain authentication for various transactions or operations. The subscriber confidential information 120 comprises information that can be used to identify a subscriber. For example, the subscriber confidential information 120 may include one or more PIN values, security questions and answers provided by the subscriber, details of personal history, and other information usable to identify the subscriber.

The authentication platform 122 includes one or more computers and associated computing devices that provide authentication services to entities that communicate with the authentication platform. The authentication platform 122 is coupled to the service provider server 116 via the Internet 114 or other suitable network. The authentication platform 122 receives requests for authentication via the Internet 114 and services the requests via the service provider server 116 to verify that the subscriber associated with the UE 102 has requested and authorized performance of an operation by an entity requesting authentication via the authentication platform 122. The authentication platform 122 includes an authentication application 124 and a subscriber/provider data store 126. The subscriber/provider data store 126 maps telephone numbers, or other information identifying a UE, to a wireless communication service provider that supplies wireless service to the UE 102. The various wireless service providers may maintain the subscriber/provider data store 126 to allow for provision of authentication services via the authentication platform 112. The service provider networks 110, the Internet 114, and other public and/or private networks may be abstracted as a network 115.

The authentication application 124 can receive requests for authentication from various entities. A request for authentication may include a telephone number for a UE, a subscriber name, and information describing the transaction or operation for which authentication is requested. Information describing the transaction of operation may include a name of the entity requesting authentication and sufficient details to identify the operation or transaction. The authentication application 124 may access the subscriber/provider data store 126 to determine which of a plurality of wireless service providers provides wireless service to the UE associated with the received telephone number. In some embodiments, the authentication application 124 may query each of the plurality of wireless service providers to identify the wireless service provider that provides wireless service to the UE 102 corresponding to the received telephone number. For example, if association of the received telephone number to a wireless service provider is not stored in the subscriber/provider data store 126, then the authentication application 124 may query the plurality of service providers to identify the wireless service provider associated with the received telephone number and update the subscriber/provider data store 126 to include the identified service provider/telephone number association.

Additionally, if the wireless service provider associated with the received telephone number replies that the telephone number is not associated with a current subscription account maintained by that provider of record in the subscriber/provider data store 126, the authentication application 124 may query a plurality of service providers—excluding the service provider associated with the telephone number in the subscriber/provider data store 126—to find if the telephone number is associated with one of those wireless service providers. If one of the wireless service providers indicates that the telephone number is served by that provider, the authentication application 124 may update the subscriber/provider data store 126 accordingly. Alternatively, a different remediation process may be performed.

Having identified the wireless service provider that provides wireless service to the telephone number received in the authentication request, the authentication application 124 transmits a request for authentication by the identified service provider. For example, if the wireless service provider corresponding to the service provider server 116 is identified as providing wireless service to the received telephone number, then the authentication application 124 can communicate with the service provider server 116 via the Internet 114 to request that the service provider server 116 verify that a subscriber authorizes the specific transaction or operation identified in the request. The request for authentication by the identified service provider may include information similar to that received by the authentication platform 122, e.g., telephone number, subscriber name, and details of the transaction or operation to be authenticated.

On receipt of the request for authentication, the subscriber authentication service 118 verifies that the received telephone number is associated with the received subscriber name. A lack of association between the received telephone number and the received subscriber name may cause the subscriber authentication service to return indication of authentication failure to the authentication platform 122. If the subscriber authentication service 118 determines that the received telephone number is associated with the received subscriber name, then the subscriber authentication service identifies the UE (e.g., UE 102) associated with the received telephone number, and retrieves stored information describing the operational capabilities of the UE 102, and/or retrieves stored information specifying how authentication is to be performed using the UE 102. For example, if the UE 102 is a smartphone, or mobile computing device with capabilities similar to those of a smartphone, then the subscriber authentication service 118 may render a dialog on a display of the UE 102 presenting details of the transaction or operation for which authentication is requested, and requesting entry of personal identification information, such as a PIN or biometric data, to authorize the transaction or operation.

The UE 102 transmits the entered personal identification information to the subscriber authentication service 118, which accesses the subscriber confidential information 120 to retrieve stored personal identification information corresponding to that entered by the subscriber via the UE 102 to authorize the transaction or operation. The subscriber authentication service 118 compares the stored personal identification information to that entered at the UE 102. If the stored personal identification information corresponds (e.g., is identical to or statistically similar to) to the personal identification information entered at the UE 102, then the subscriber authentication service 118 transmits an indication of successful authentication to the authentication platform 122. If the stored personal identification information does not correspond (e.g., is not identical to) the personal identification information entered at the UE 102, then the subscriber authentication service 118 transmits an indication of authentication failure to the authentication platform 122.

Responsive to receipt of the authentication success or authentication failure indication provided by the subscriber authentication service 118, the authentication platform 122 forwards indication of the authentication success or failure to the entity that requested authentication of the transaction or operation. The entity may determine whether to proceed to perform the operation or transaction based on the result of the authentication process received from the authentication platform.

As described, embodiments of the system 100 provide authentication of authorization to perform any of a wide variety of operations. By providing the authentication platform 122 as a unit that is discrete and separate from the service provider server 116, authentication using a plurality of service providers can be performed. Additionally, because authentication is ultimately performed via the service provider server 116, authentication requests submitted to the authentication platform 122 by an entity can be satisfied using the personal identification information retained in the subscriber confidential information 120. For example, a single PIN can be used to authenticate all requests directed to a given subscriber received by authentication platform 122, while the PIN is known only to the service provider server 116. Thus, the system 100 simplifies the authentication process and facilitates authentication, while providing enhanced security for personal information.

Transfer of wireless service from one wireless service provider to another wireless service provider is one example of an operation to which the authentication techniques disclosed herein can be advantageously applied. As part of the transfer of wireless service, the subscriber confidential information 120 may be transferred to the different wireless service provider. Transfer of the subscriber confidential information 120 allows for application of the authentication techniques disclosed herein using the same personal identification information as the subscriber moves across carriers. Accordingly, the different wireless service providers need not reconstruct a body of subscriber confidential information 120 as the subscriber moves from wireless carrier to wireless carrier. As the subscriber confidential information 120 is moved from service provider server 116 to a server of a different service provider, the service provider server 116 may delete the subscriber confidential information 120.

Figure 2:
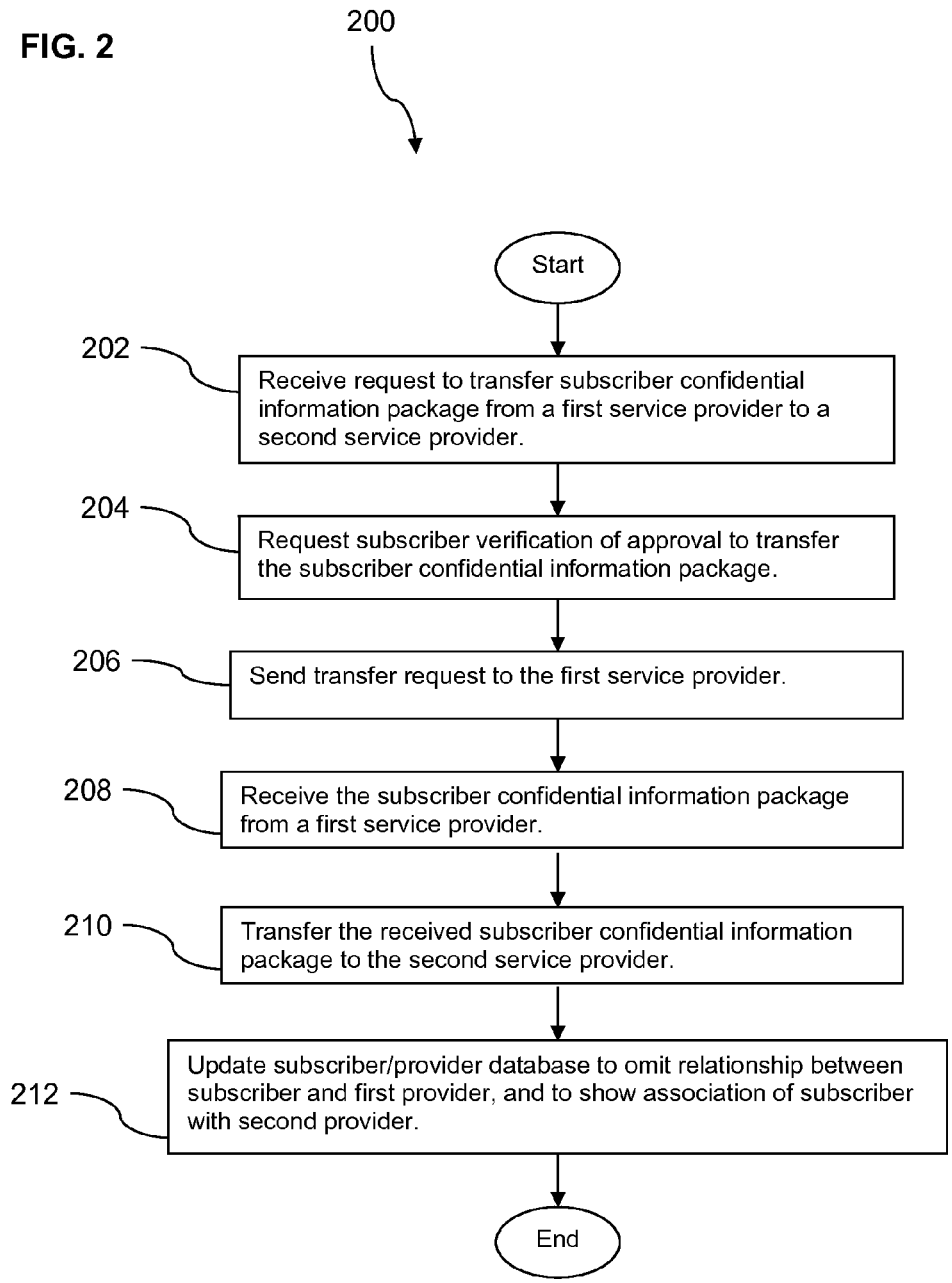
FIG. 2 is a flow chart of a method according to an embodiment of the disclosure.

FIG. 2 is a flow chart of a method 200 according to an embodiment of the disclosure. The method 200 illustrates transfer of subscriber confidential information 120 from one wireless service provider to another. Though depicted sequentially as a matter of convenience, at least some of the actions shown can be performed in a different order and/or performed in parallel. Additionally, some embodiments may perform only some of the actions shown. In some embodiments, at least some of the operations of the method 200, as well as other operations described herein, can be implemented as instructions stored in a computer readable medium and executed by one or more processors.

In block 202, the authentication platform 122 receives a request to transfer subscriber confidential information 120 from the wireless service provider associated with service provider server 116 to a different wireless service provider. The request may identify the different wireless service provider, the transfer of confidential information, a subscriber to whom the subscriber confidential information 120 pertains, and a telephone number assigned to the subscriber. The authentication platform may look up the wireless service provider associated with the received telephone number in the subscriber/provider data store 126.

In block 204, the authentication platform 122 sends a request for authentication to the service provider server 116. In turn, the subscriber authentication service 118 contacts the UE 102 using a method deemed best suited for authentication using the UE 102, and the results of personal identification information entered via the UE 102 are compared to the subscriber confidential information 120. Results of the comparison are provided to the authentication platform 122 and to the entity that requests transfer of the subscriber confidential information 120.

In block 206, the request to transfer subscriber confidential information 120 is sent to the service provider server 116. The service provider server 116 packages the subscriber confidential information 120 for transfer. For example, the subscriber confidential information 120 may be encrypted in a manner prescribed or known to the wireless service provider to which the subscriber confidential information 120 is to be transferred.

In block 208, the authentication platform 122 receives the subscriber confidential information 120 from the service provider server 116, and transfers the received subscriber confidential information 120 to the different wireless service provider in block 210. In some embodiments, the service provider server 116 may transfer the subscriber confidential information 120 directly to the different wireless service provider.

In block 212, the authentication platform 122 updates the subscriber/provider data store 126 to reflect the different wireless service provider as providing wireless service to subscriber's telephone number. For example, the authentication platform 122 may delete indication of a relationship between the subscriber's telephone number and the wireless service provider associated with the service provider server 116, and add to the data store 126 an indication of the new relationship between the subscriber's telephone number and the different wireless service provider to which the subscriber confidential information was transferred.

Figure 3:
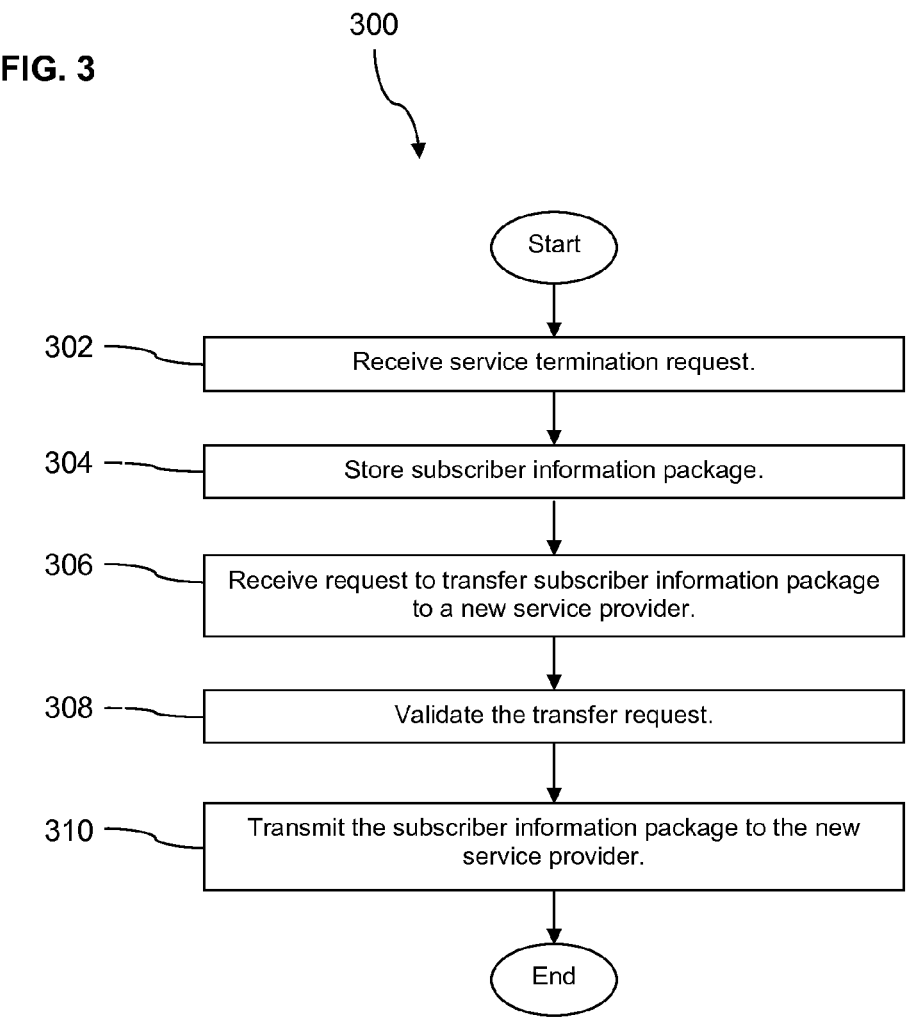
FIG. 3 is a flow chart of a method according to an embodiment of the disclosure.

FIG. 3 is a flow chart of a method 300 according to an embodiment of the disclosure. The method 300 illustrates termination of service at a first wireless service provider and transfer of subscriber confidential information 120 from the first wireless service provider to a second wireless service provider. Though depicted sequentially as a matter of convenience, at least some of the actions shown can be performed in a different order and/or performed in parallel. Additionally, some embodiments may perform only some of the actions shown. In some embodiments, at least some of the operations of the method 300, as well as other operations described herein, can be implemented as instructions stored in a computer readable medium and executed by one or more processors.

In block 302, the service provider server 116 receives a request to terminate wireless service. The request may specify the subscriber's name, and the subscriber's telephone number. In response to the request, the subscriber authentication service 118 may contact the UE 102, where the subscribers' telephone number is assigned to the UE 102, using a method deemed best suited for authentication using the UE 102 to authenticate the request for termination of service. The subscriber authentication service 118 compares personal identification information entered via the UE 102 to the subscriber confidential information 120.

If the authentication confirms that wireless service is to be terminated, then in block 304, the service provider server 116 stores the subscriber confidential information 120 as a package suitable for transfer to a different wireless service provider.

In block 306, the service provider server 116 receives a request to transfer the stored subscriber confidential information to the second wireless service provider. In response to the request, in block 308, the subscriber authentication service 118 may contact the UE 102 using a method deemed best suited for authentication using the UE 102, and personal identification information entered via the UE 102 are compared to the subscriber confidential information 120.

In block 310, responsive to authentication of the transfer request received in block 306, the service provider server 116 transmits the stored subscriber confidential information 120 to the second wireless service provider.

Figure 4:
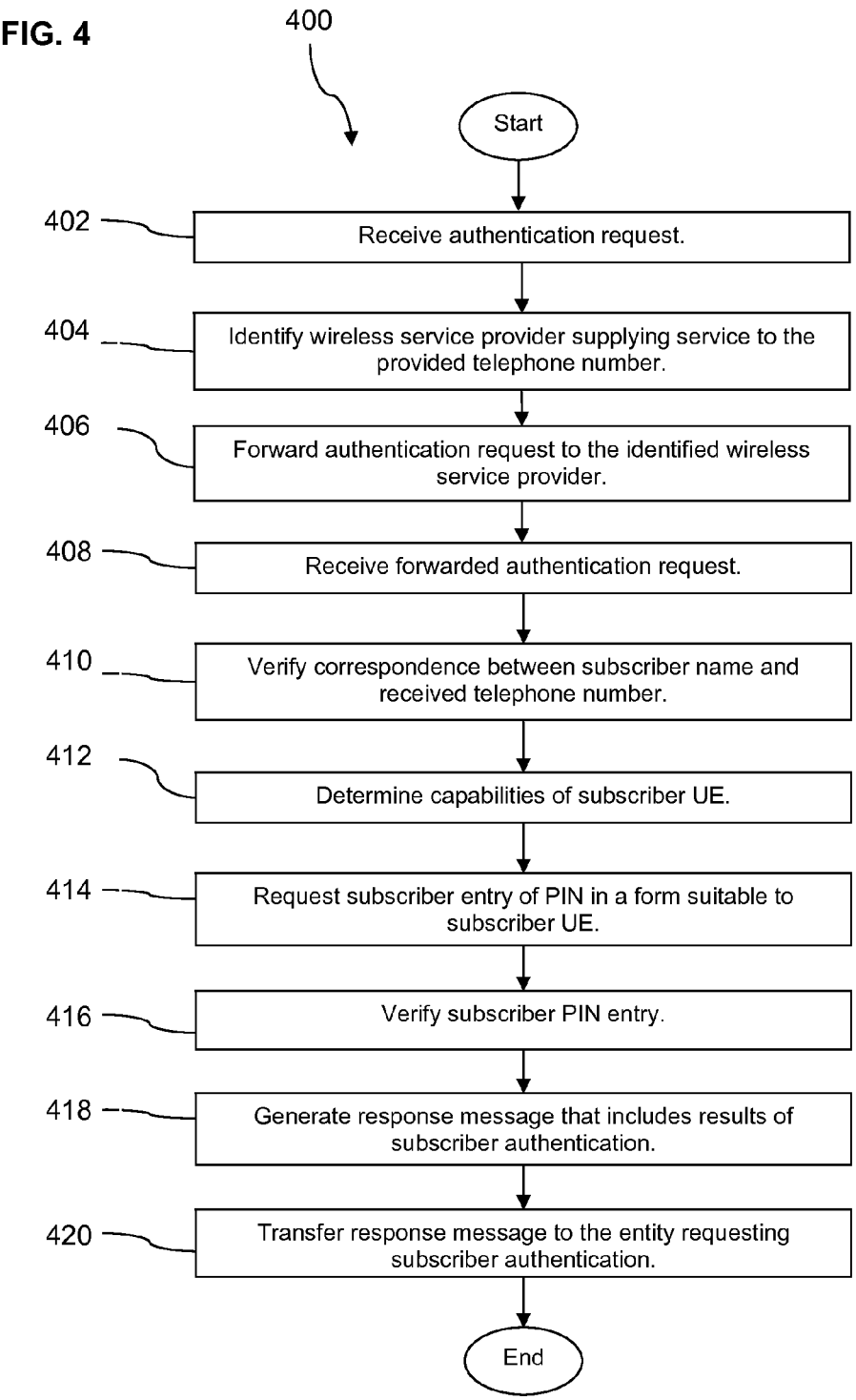
FIG. 4 is a flow chart of a method according to an embodiment of the disclosure.

FIG. 4 is a flow chart of a method 400 according to an embodiment of the disclosure. The method 400 illustrates authentication as performed by the system 100 and described herein. Though depicted sequentially as a matter of convenience, at least some of the actions shown can be performed in a different order and/or performed in parallel. Additionally, some embodiments may perform only some of the actions shown. In some embodiments, at least some of the operations of the method 400, as well as other operations described herein, can be implemented as instructions stored in a computer readable medium and executed by one or more processors.

In block 402, the authentication platform 122 receives, via the Internet 114, a request for authentication from an operational entity. The request for authentication may include a telephone number for a UE, a subscriber name, and information describing the transaction or operation for which authentication is requested. Information describing the transaction or operation may include a name of the entity requesting authentication and sufficient details to identify the operation or transaction.

In block 404, responsive to the received request, the authentication application 124 may access the subscriber/provider data store 126 to determine which of a plurality of wireless service providers provides wireless service to the UE associated with the received telephone number. In some embodiments, the authentication application 124 may query each of the plurality of wireless service providers to identify the wireless service provider that provides wireless service to the UE corresponding to the received telephone number. For example, if association of the received telephone number to a wireless service provider is not stored in the subscriber/provider data store 126, then the authentication application 124 may query the plurality of service providers to identify the wireless service provider associated with the received telephone number and update the subscriber/provider data store 126 to include the identified service provider/telephone number association.

In block 406, having identified the wireless service provider that provides wireless service to the telephone number received in the authentication request, the authentication platform 122 forwards a request for authentication by the identified service provider. For example, if the wireless service provider corresponding to the service provider server 116 is identified as providing wireless service to the received telephone number, then the authentication platform 122 can communicate with the service provider server 116 via the Internet 114 to request that the service provider server 116 verify that a subscriber authorizes the specific transaction or operation identified in the request. The request for authentication by the identified service provider may include information similar to that received by the authentication platform 122, e.g., telephone number, subscriber name, and details of the transaction or operation to be authenticated.

In block 408, the service provider server 116 receives the forwarded authentication request. On receipt of the request for authentication, the subscriber authentication service 118 verifies that the received telephone number is associated with the received subscriber name in block 410. A lack of association between the received telephone number and the received subscriber name may cause the subscriber authentication service to return indication of authentication failure to the authentication platform. If the subscriber authentication service 118 determines that the received telephone number is associated with the received subscriber name, then the subscriber authentication service identifies the UE (e.g., UE 102) associated with the received telephone number, and, in block 412, retrieves stored information describing the operational capabilities of the UE 102, and/or retrieves stored information specifying how authentication is to proceed using the UE 102.

In block 414, the subscriber authentication service 118 requests subscriber entry of personal identification information (e.g., a PIN) to authenticate the subscriber and authorization of the identified transaction/operation. For example, if the UE 102 is a smartphone, or mobile computing device with capabilities similar to those of a smartphone, then the subscriber authentication service 118 may render a dialog on a display of the UE 102 presenting details of the transaction or operation for which authentication is requested, and requesting entry of personal identification information, such as a PIN or biometric data, to authorize the transaction or operation. If the capabilities of the UE 102 are determined to be more limited, then the subscriber authentication service 118 may send a text message to the UE 102 presenting details of the transaction or operation for which authentication is requested, and requesting a return text message containing the subscriber's personal identification information.

The UE 102 transmits the entered personal identification information to the subscriber authentication service 118, and, in block 416, the subscriber authentication service 118 accesses the subscriber confidential information 120 to retrieve stored personal identification information corresponding to that entered by the subscriber via the UE 102 to authorize the transaction or operation. The subscriber authentication service 118 verifies the received personal identification information by comparing the stored personal identification information to that entered at the UE 102.

In block 418, the subscriber authentication service 118, generates an authentication response message that includes the results of the subscriber authentication, and transmits the response message to the authentication platform 122 in block 420. If the stored personal identification information corresponds to (e.g., is identical to or statistically similar to) the personal identification information entered at the UE 102, then the subscriber authentication service 118 generates and transmits an indication of successful authentication to the authentication platform 122. If the stored personal identification information does not correspond (e.g., is not identical to) the personal identification information entered at the UE 102, then the subscriber authentication service 118 generates and transmits an indication of authentication failure to the authentication platform 122.

Responsive to receipt of the authentication success or authentication failure indication provided by the subscriber authentication service 118, the authentication platform 122 forwards indication of the authentication success or failure to the entity that requested authentication of the transaction or operation. The entity may determine whether to proceed to perform the operation or transaction based on the result of the authentication process received from the authentication platform.

Figure 5:
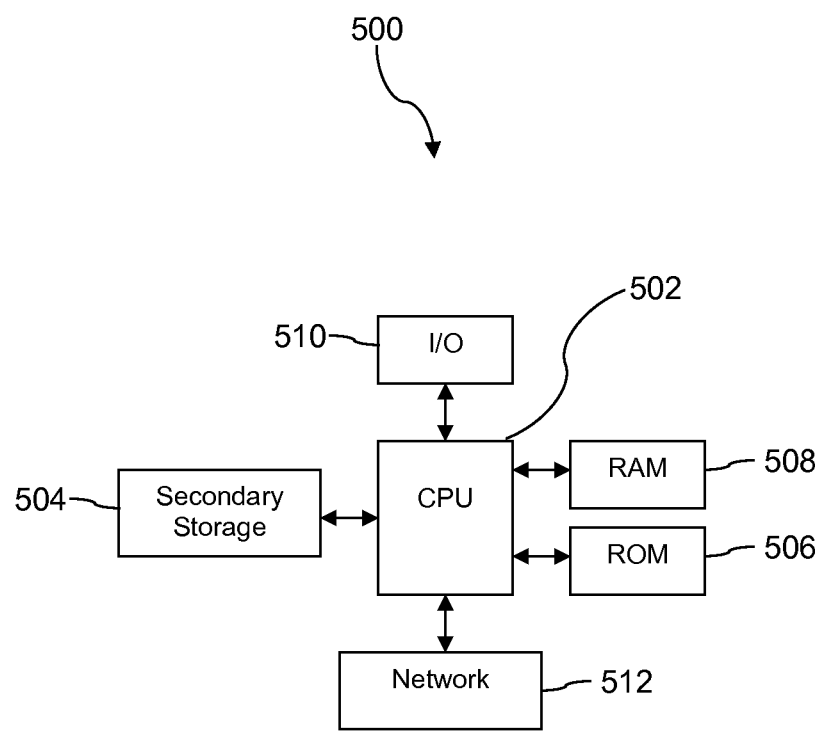
FIG. 5 illustrates an exemplary computer system suitable for implementing the several embodiments of the disclosure.

FIG. 5 illustrates a computer system 500 suitable for implementing one or more embodiments disclosed herein. For example, the authentication platform 122 and/or the service provider server 116 may be implemented using embodiments of the computer system 500. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

Figure 6:
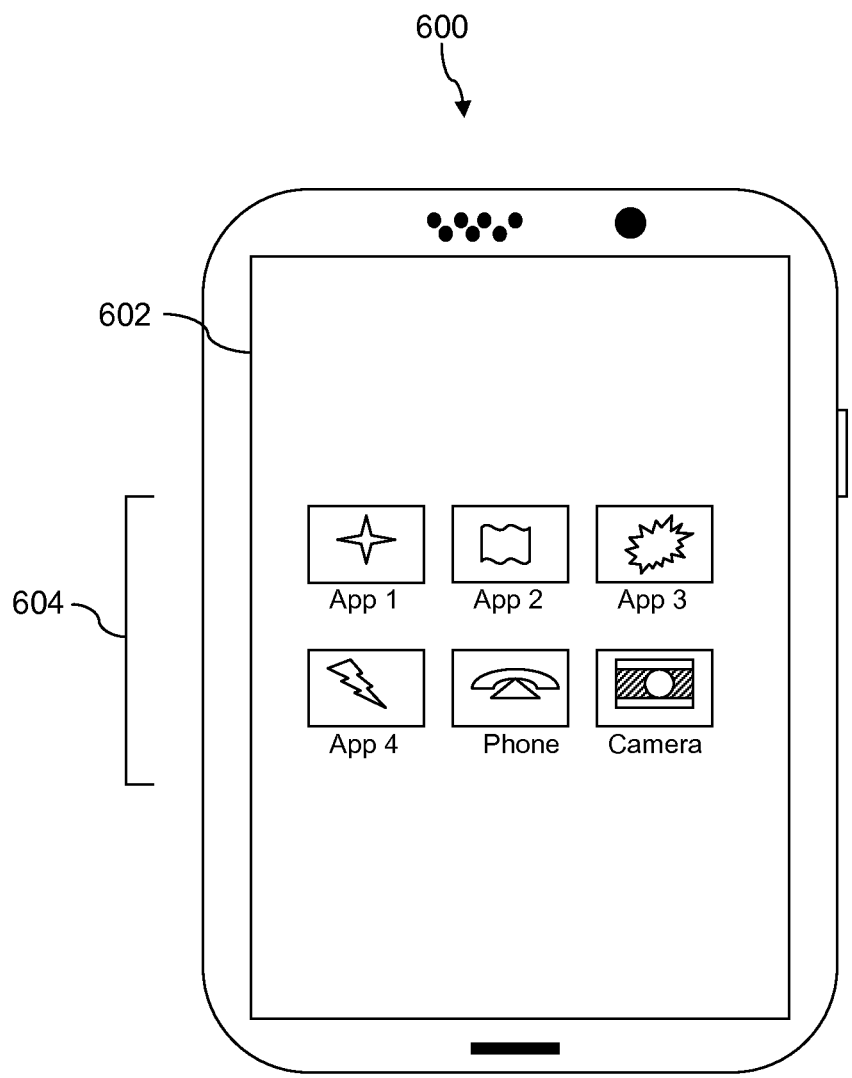
FIG. 6 shows an example of user equipment (UE) in accordance with various embodiments.

FIG. 6 depicts the user equipment (UE) 600, which is operable for implementing aspects of the present disclosure, but the present disclosure should not be limited to these implementations. For example, the UE 102 described above may be implemented in a form substantially similar to that of UE 600. Though illustrated as a mobile phone, the UE 600 may take various forms including a wireless handset, a pager, a personal digital assistant (PDA), a gaming device, or a media player. The UE 600 includes a touchscreen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

Figure 7:
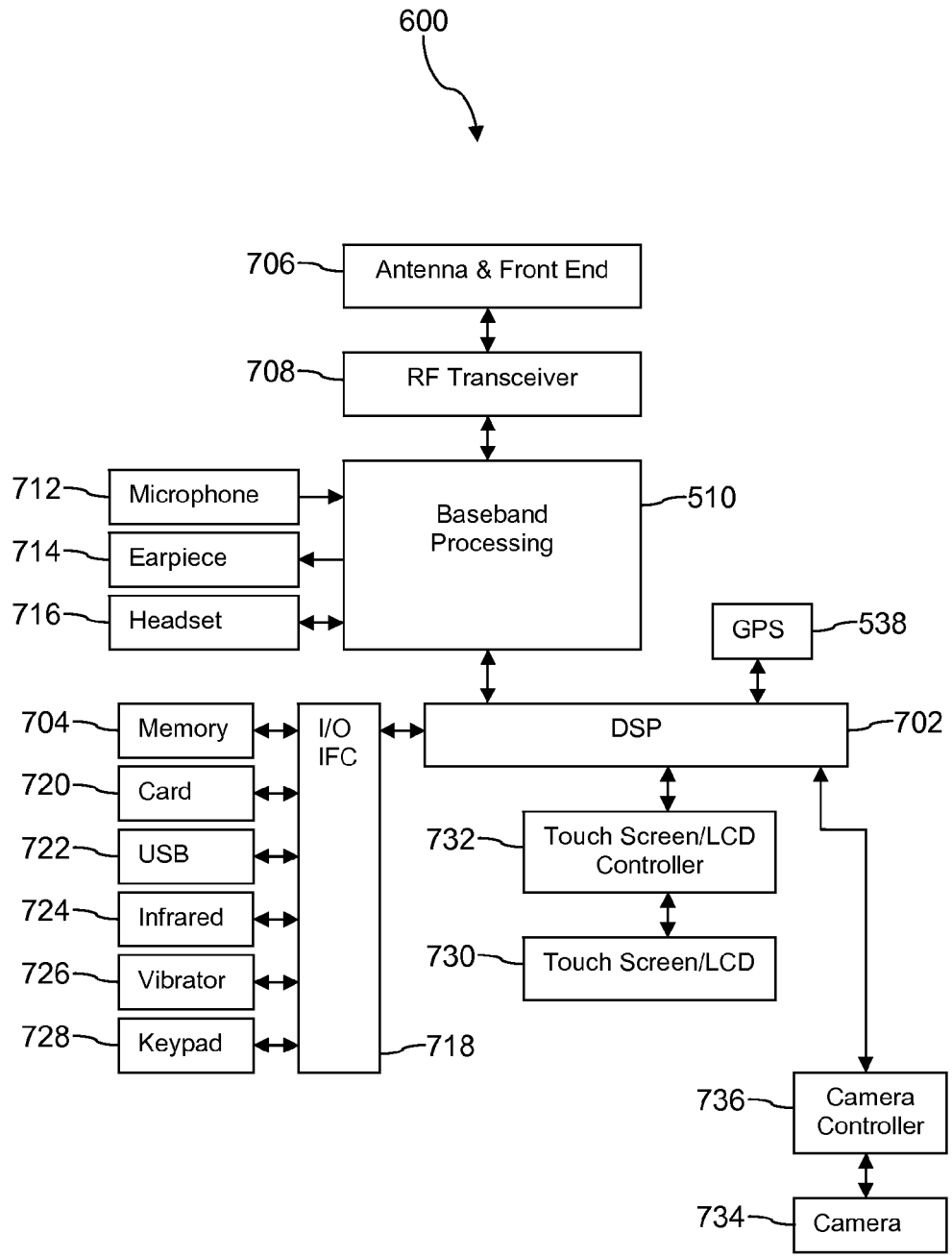
FIG. 7 shows a block diagram of a UE in accordance with various embodiments.

FIG. 7 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include an antenna and front end unit 706, a radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen liquid crystal display (LCD) with a touch screen display 730, a touch screen/LCD controller 732, a camera 734, a camera controller 736, and a global positioning system (GPS) receiver 738. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth® interface or an IEEE 802.11 compliant wireless interface may enable the UE 600 to communicate wirelessly with other nearby handsets and/or wireless base stations. In an embodiment, the UE 600 may comprise a near field communication (NFC) transceiver. The NFC transceiver may be used to complete payment transactions with point-of-sale terminals or other communications exchanges. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 8A:
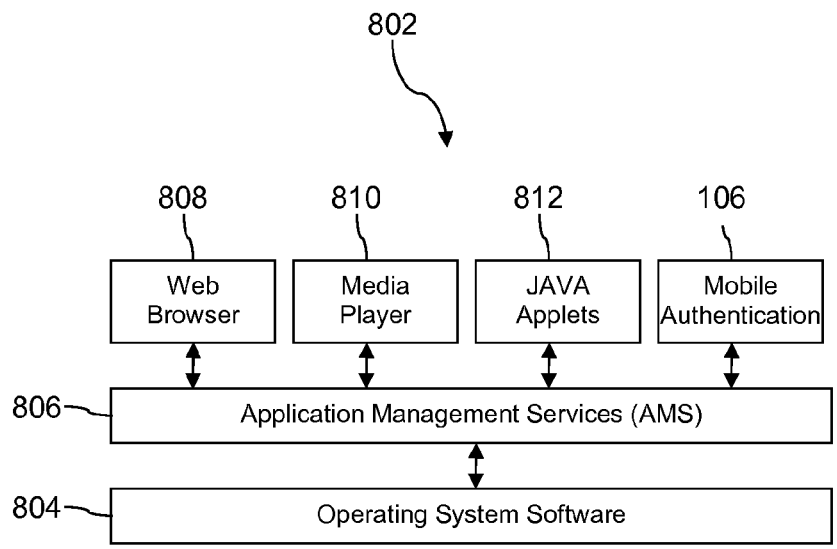
FIGS. 8A and 8B illustrate various software architectures for a UE in accordance with various embodiments.

FIG. 8A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 700. Also shown in FIG. 8A are a web browser application 808, a media player application 810, and JAVA applets 812. The web browser application 808 may be executed by the UE 600 to browse content and/or the Internet, for example when the UE 600 is coupled to a network via a wireless link. The web browser application 808 may permit a user to enter information into forms and select links to retrieve and view web pages. The media player application 810 may be executed by the UE 600 to play audio or audiovisual media. The JAVA applets 812 may be executed by the UE 600 to provide a variety of functionality including games, utilities, and other functionality.

Figure 8B:
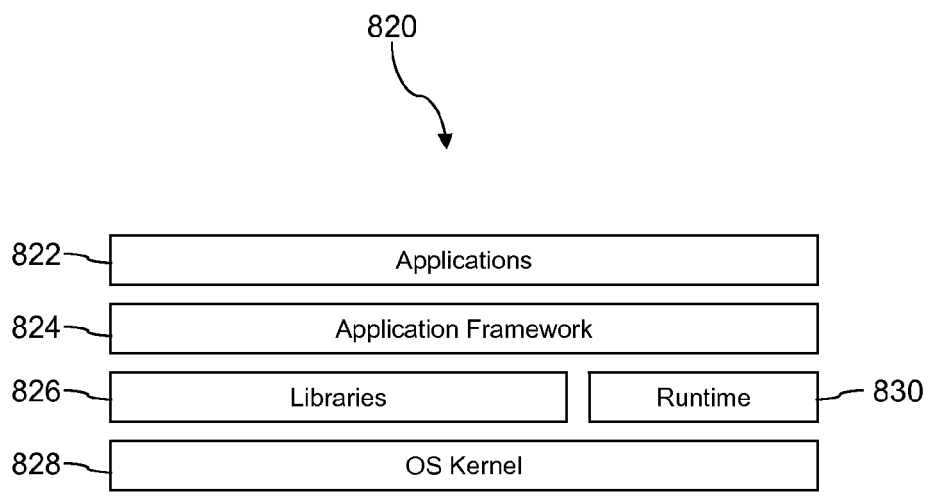

FIG. 8B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wireless communication service subscriber authentication platform, comprising:
 a processor;
 a memory; and
 an application stored in the memory that, when executed by the processor
  receives a request to authenticate a user from an enterprise, wherein the request comprises subscriber information received by the enterprise from a mobile communication service subscriber, the subscriber information comprising a phone number of a user equipment device (UE) associated with the mobile communication service subscriber and an identity of the mobile communication service subscriber,
  responsive to receiving the authentication request, determines a wireless communication service provider that provides wireless communication service to the UE based on the phone number of the UE,
  sends a request for information about the mobile communication service subscriber to the wireless communication service provider determined to provide service to the UE, wherein the information request comprises the phone number of the UE, the identity of the mobile communication service subscriber, and an identification of the enterprise that sent the authentication request to the authentication platform,
  receives information from the wireless communication service provider determined to provide service to the UE, and
  sends an authentication response to the enterprise,
  wherein the enterprise completes a transaction with the mobile communication service subscriber based on the authentication response received from the authentication platform.

2. The authentication platform of claim 1, further comprising a data store that stores a map of subscriber to wireless communication service provider association, and wherein the application accesses the data store to determine the wireless communication service provider that provides wireless communication service to the UE.

3. The authentication platform of claim 1, wherein the application is to query a plurality of wireless communication service providers to determine which of the plurality of wireless communication service providers provides wireless communication service to the UE.

4. The authentication platform of claim 1, wherein the authentication response includes confirmation that the UE is associated with the mobile communication service subscriber and that the mobile communication service subscriber has authorized the enterprise to perform an operation.

5. The authentication platform of claim 1, wherein the authentication response authorizes the enterprise to perform a commercial transaction that involves the mobile communication service subscriber.

6. The authentication platform of claim 1, wherein the authentication response authorizes transfer of the UE from the wireless communication service provider determined to provide service to the UE to a different wireless communication service provider.

7. The authentication platform of claim 1, wherein the authentication response authorizes transfer of security information that identifies the mobile communication service subscriber accumulated by the wireless communication service provider determined to provide service to the UE to a different wireless communication service provider.

8. A method of authenticating a wireless communication service subscriber, comprising:
 receiving, by a server computer, a request to terminate a wireless communication service subscription of a subscriber at a wireless communication service provider;
 responsive to receiving the termination request, storing a confidential subscriber information package associated with the terminated service subscription of the subscriber, wherein the confidential subscriber information package comprises a personal identification number (PIN) and a plurality of answers to security questions;
 receiving, by the server computer, a request from a different wireless communication service provider to transfer the confidential subscriber information package associated with the terminated service subscription to the different wireless communication service provider;
 receiving, by the wireless communication service provider, a request for authentication of the subscriber, wherein the request comprises a telephone number and a subscriber name;
 verifying, by the wireless communication service provider, correspondence between the telephone number and the subscriber name; and
 transmitting, by the server computer, the confidential subscriber information package associated with the terminated service subscription to the different wireless communication service provider based at least on the correspondence between the telephone number and the subscriber name.

9. The method of claim 8, further comprising: responsive to receiving the request to transfer the confidential subscriber information package, querying the subscriber to determine whether the subscriber authorizes transfer of the confidential subscriber information package to the different wireless communication service provider.

10. The method of claim 8, further comprising:
 requesting, by the wireless communication service provider, entry of a personal identification value by the subscriber;
 receiving, by the wireless communication service provider, a personal identification value entered by the subscriber; and
 verifying, by the wireless communication service provider, the personal identification value entered by the subscriber, wherein the confidential subscriber information package is transmitted to the different wireless communication service provider based on the verification of the personal identification value entered by the subscriber.

11. The method of claim 10, further comprising:

producing, based on a result of the verifying of the correspondence between the phone number and the subscriber name and the verifying of the personal identification value entered by the subscriber, a response message that indicates whether the authentication was successful;

transferring the response message to a transmitter of the authentication request.

12. The method of claim 8, wherein the confidential subscriber information package comprises biometric data for verifying an identity of the subscriber, security questions answered by the subscriber, and answers to the security questions provided by the subscriber.

* * * * *